(12) United States Patent
Chen et al.

(10) Patent No.: US 10,897,522 B2
(45) Date of Patent: *Jan. 19, 2021

(54) METHOD, APPARATUS, AND ELECTRONIC DEVICE FOR PROCESSING CONSENSUS REQUESTS IN A BLOCKCHAIN CONSENSUS NETWORK

(71) Applicant: ADVANCED NEW TECHNOLOGIES CO., LTD., Grand Cayman (KY)

(72) Inventors: Rui Chen, Hangzhou (CN); Guofei Jiang, Hangzhou (CN); Huabing Du, Hangzhou (CN); Husen Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,481

(22) Filed: Apr. 13, 2020

(65) Prior Publication Data
US 2020/0244764 A1 Jul. 30, 2020

Related U.S. Application Data

(63) Continuation of application No. 16/752,365, filed on Jan. 24, 2020, now Pat. No. 10,721,326, which is a
(Continued)

(30) Foreign Application Priority Data

Jul. 14, 2017 (CN) .......................... 2017 1 0573527

(51) Int. Cl.
*H04L 29/08* (2006.01)
*H04L 9/06* (2006.01)
*G06Q 20/02* (2012.01)

(52) U.S. Cl.
CPC ............. *H04L 67/32* (2013.01); *G06Q 20/02* (2013.01); *H04L 9/0637* (2013.01); *H04L 67/10* (2013.01); *G06Q 2220/00* (2013.01)

(58) Field of Classification Search
None
See application file for complete search history.

(56) References Cited

U.S. PATENT DOCUMENTS 9,397,985 B1 7/2016 Seger, II et al.
9,436,923 B1 9/2016 Sriram et al.
(Continued)

FOREIGN PATENT DOCUMENTS

CN 101958804 A 1/2011
CN 103218455 A 7/2013
(Continued)

OTHER PUBLICATIONS

Office Action for Taiwanese Patent Application No. 107115874 dated May 9, 2019, 3 pages.
(Continued)

*Primary Examiner* — Scott B Christensen

(57) ABSTRACT

A method for processing a consensus request in a computer network comprises: determining a pending request set, the pending request set including one or more pending consensus requests; determining a number of subsets that are in a consensus stage, wherein the subsets comprise the pending consensus requests that are obtained from the pending request set; and when the number of subsets that are in the consensus stage is less than a preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be
(Continued)

simultaneously in the consensus stage in the computer network.

20 Claims, 6 Drawing Sheets

Related U.S. Application Data continuation of application No. 16/034,689, filed on Jul. 13, 2018, now Pat. No. 10,693,994.

(56) References Cited

U.S. PATENT DOCUMENTS

| | | | |
|---|---|---|---|
| 9,569,771 | B2 | 2/2017 | Lesavich et al. |
| 2009/0300210 | A1 | 12/2009 | Ferris |
| 2014/0365659 | A1 | 12/2014 | Schmidt et al. |
| 2016/0028552 | A1 | 1/2016 | Spanos et al. |
| 2016/0098723 | A1 | 4/2016 | Feeney |
| 2016/0125040 | A1 | 5/2016 | Kheterpal et al. |
| 2016/0306982 | A1 | 10/2016 | Seger, II et al. |
| 2016/0330034 | A1 | 11/2016 | Back et al. |
| 2017/0011460 | A1 | 1/2017 | Molinari et al. |
| 2017/0033932 | A1 | 2/2017 | Truu et al. |
| 2017/0075941 | A1 | 3/2017 | Finlow-bates |
| 2017/0103468 | A1 | 4/2017 | Orsini et al. |
| 2017/0132615 | A1 | 5/2017 | Castinado et al. |
| 2017/0270493 | A1* | 9/2017 | Lugli .................... G06Q 20/027 |
| 2018/0216946 | A1 | 8/2018 | Gueye |

FOREIGN PATENT DOCUMENTS

| | | |
|---|---|---|
| CN | 105976231 A | 9/2016 |
| CN | 106060036 A | 10/2016 |
| CN | 106445711 A | 2/2017 |
| CN | 106603698 A | 4/2017 |
| TW | 201627889 A | 8/2016 |
| TW | 201643783 A | 12/2016 |

OTHER PUBLICATIONS

International Search Report and Written Opinion for Application No. PCT/US2018/041978, dated Sep. 17, 2018, 14 pages.

Written Opinion of the International Preliminary Examining Authority for PCT Application No. PCT/US2018/041978 dated Jul. 16, 2019 (9 pages).

Li, Bijun et al., SAREK: Optimistic Parallel Ordering in Byzantine Fault Tolerance, 2016 12th European Dependable Computing Conference, Sep. 5, 2016, 77-88.

Kotla, Ramakrishna et al., High Throughout Byzantine Fault Tolerance, Proceedings of the 2004 International Conference on Dependable Systems and Networks, Jun. 28, 2004, 534-543.

Wang, Wenbo et al., A Survey on Consensus Mechanisms and Mining Management n Blockchain Networks, ARXIV. Org., Cornell University, May 7, 2018, 1-33.

First Office Action and First Search for Chinese Application No. 201710573527.7 dated Jul. 25, 2019 with English machine translation (22 pages).

Written Opinion of the International Preliminary Examining Authority for PCT Application No. PCT/US2018/041978 dated Oct. 29, 2019 (8 ppages).

Kokoris-Kogias et al., "OmniLedger: A Secure, Scale-Out, Decentralized Ledger," IACR, International Association for Cryptologic Research, May 11, 2017 (17 pages).

Luu et al., "A Secure Sharding Protocol for Open Blockchains," Computer and Communications Security, ACM, Oct. 24, 2016 (14 pages).

Croman et al., "On Scaling Decentralized Blockchains," International Conference on Computer Analysis of Images and Patterns, Aug. 31, 2016 (34 pages).

Baliga. "Understanding Blockchain Consensus Models," Apr. 2017 (Year: 2017).

International Preliminary Report on Patentability for PCT Application No. PCT/US2018/041978 dated Jan. 8, 2020 (17 pages).

Notice of Allowance for U.S. Appl. No. 16/752,365 dated Mar. 23, 2020.

Non-Final Office Action for U.S. Appl. No. 16/034,689, dated Dec. 30, 2019, 9 pages.

Search Report and Office Action for Chinese Application No. 201710573527.7, dated Jul. 25, 2019, 22 pages (English Machine Translation).

Second Office Action dated Apr. 17, 2020, issued in related Chinese Application No. 201710573527.7, with English machine translation (21 pages).

* cited by examiner

101: Set determination module

103: Quantity determination module

105: Determination module

FIG. 3

METHOD, APPARATUS, AND ELECTRONIC DEVICE FOR PROCESSING CONSENSUS REQUESTS IN A BLOCKCHAIN CONSENSUS NETWORK

CROSS REFERENCE TO RELATED APPLICATION

The present application is a continuation of U.S. patent application Ser. No. 16/752,365 filed on Jan. 24, 2020, entitled "Method, Apparatus, and Electronic Device for Processing Consensus Requests in a Blockchain Consensus Network," now U.S. Pat No. 10,721,326 issued on Jul. 20, 2020, which is a continuation of U.S. patent application Ser. No. 16/034,689 filed on Jul. 13, 2018, entitled "Method, Apparatus, and Electronic Device for Processing Consensus Requests in a Blockchain Consensus Network", now U.S. Pat. No. 10,693,994 issued on Jun. 22, 2020. The U.S. patent application Ser. No. 16/034,689 is based on and claims priority to Chinese Patent Application No. 201710573527.7, filed on Jul. 14, 2017. The entire contents of all of the above-identified applications are incorporated herein by reference.

TECHNICAL FIELD

The present application relates to the field of computer technology, and in particular to a method, an apparatus, and an electronic device for processing a consensus request in a blockchain consensus network.

BACKGROUND

Along with the development of computer technology, blockchain technology (also known as distributed ledger technology) becomes popular for decentralization, openness, transparency, non-tamperability, reliability, and other advantages, and has obtained widespread applications in many fields such as smart contracts, securities trading, e-commerce, the Internet of Things, social communication, file storage, existence proof, etc.

In the application of the blockchain, a plurality of copies in the consensus network of the blockchain often require finally reaching a unanimously determined and unique selection result for a plurality of alternative solutions, and the process of making this selection can be called consensus. However, a performance bottleneck exists in the consensus process of existing technologies, which makes it hard to improve the efficiency of processing of consensus requests.

Therefore, there is an urgent demand for a solution that can increase processing efficiency to improve the processing performance of the consensus network.

SUMMARY

The embodiments of the present application provide a method, an apparatus, and an electronic device for processing a consensus request in a blockchain consensus network, which can improve the processing efficiency of the consensus network for consensus requests.

The embodiments of the present disclosure may include the following technical solution:

In a first aspect, the embodiments of the present disclosure provide a method for processing a consensus request in a computer network (e.g., a consensus network or a blockchain consensus network), comprising: determining a pending request set, the pending request set including one or more pending consensus requests; determining a number of subsets that are in a consensus stage, wherein the subsets comprise the pending consensus requests that are obtained from the pending request set; when the number of subsets that are in the consensus stage is less than the preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be simultaneously in the consensus stage in the computer network. The method may be implemented by a processor of a node of the computer network.

In some embodiments, after determining the pending request set, the method further includes: obtaining the pending consensus requests from the pending request set to form the subsets.

In some embodiments, in the method provided in the first aspect of the embodiment of the present application, after obtaining the pending consensus requests from the pending request set to form the subsets, the method further includes: assigning serial numbers to the subsets, wherein the serial numbers are continuously and monotonically increasing natural numbers.

In some embodiments, determining the number of subsets that are in the consensus stage includes: determining the first serial number based on the serial numbers of the subsets that have completed the consensus stage; and determining the second serial number based on the serial numbers of the subsets that have entered the consensus stage; determining the number of subsets that are in the consensus stage based on the first serial number and second serial number.

In some embodiments, determining the first serial number based on the serial numbers of the subsets that have completed the consensus stage includes: determining the largest serial number of the serial numbers of the subsets that have completed the consensus stage to be the first serial number; determining the second serial number based on the serial numbers of the subsets that have entered the consensus stage includes: determining the largest serial number of the serial numbers of the subsets that have entered the consensus stage to be the second serial number; determining the number of subsets that are in the consensus stage based on the first serial number and the second serial number includes: determining a difference between the first serial number and the second serial number to be the number of subsets that are in the consensus stage.

In some embodiments, when the number of subsets that are in the consensus stage is less than the preset concurrent number of the computer network, issuing consensus proposal for the new subset to the computer network to cause the new subset to enter the consensus stage includes: when the number of subsets that are in the consensus stage is less than the preset concurrent number of the computer network, determining the new subset and a serial number of the new subset based on the second serial number; issuing a consensus proposal for the new subset to the computer network to cause the new subset to enter the consensus stage.

In some embodiments, determining the new subset and a serial number of the new subset based on the second serial number includes: obtaining the pending consensus request from the pending request set to form the new subset; based on the second serial number, incrementing the number of the second serial number by one to serve as the serial number of the new subset.

In some embodiments, determining the new subset and a serial number of the new subset based on the second serial number includes: based on the second serial number, incrementing the number of the second serial number by one to serve as the serial number of the new subset; determining the new subset based on the serial numbers of the new subset.

In some embodiments, determining the number of subsets that are in the consensus stage includes: after issuing the consensus proposal for the new subset to the computer network to cause the new subset to enter the consensus stage, re-determining the number of subsets that are in the consensus stage.

In some embodiments, after issuing the consensus proposal for the new subset to the computer network, the method further includes: performing consensus process for the pending consensus requests included in the new subset; when preset conditions are satisfied, writing consensus results of the pending consensus requests included in the new subset into a blockchain to conclude the consensus stage.

In some embodiments, satisfying the preset condition includes: subsets with serial numbers before a serial number of the new subset having completed the consensus phase.

In some embodiments, determining the number of subsets that are in the consensus stage includes: after writing the consensus results of the pending consensus requests included in the new subset into the blockchain, re-determining the number of subsets that are in the consensus stage.

In some embodiments, writing the consensus results for the pending consensus requests included in the new subset into the blockchain includes: writing the consensus results of the pending consensus requests included in the new subset into the blockchain according to a time sequence in which the pending consensus requests are received.

In a second aspect, the embodiments of the present disclosure further provide a method for processing the consensus requests in a computer network includes: determining a pending request set, the pending request set including one or more pending consensus requests; after receiving a consensus proposal for a new subset, determining whether a number of subsets that are in the consensus stage is less than the preset concurrent number of the computer network, wherein the subsets comprise the pending consensus requests obtained from the pending request set by a primary node; if the number of subsets that are in the consensus stage is less than the preset concurrent number of the computer network, entering the new subset to the consensus stage to process the pending consensus requests. The method may be implemented by a processor of a node of the computer network.

In some embodiments, before determining whether the number of subsets that are in the consensus stage is less than the preset concurrent number of the computer network, the method further comprises: determining the number of subsets that are in the consensus stage.

In some embodiments, entering the new subset to the consensus stage to process the pending consensus requests includes: performing consensus process for the pending consensus requests included in the new subset; when the preset conditions are satisfied, writing the consensus results of the pending consensus requests included in the new subset into the blockchain to conclude the consensus stage.

In some embodiments, satisfying the preset conditions includes: subsets with serial numbers before a serial number of the new subset having completed the consensus phase.

In a third aspect, the embodiments of the present disclosure provide an apparatus for processing a consensus request in a blockchain computer network, including: a set determining module, which determines a set of pending requests, determining a pending request set, the pending request set including a pending consensus request; a quantity determining module, determines a number of subsets that are in a consensus stage, wherein the subsets comprise pending consensus requests that are obtained from the pending request set; a determination module, which determines whether the number of subsets that are in the consensus stage is less than the preset concurrent number of the computer network.

In some embodiments, the apparatus further includes: a consensus proposal initiation module, wherein when the number of subsets that are in the consensus stage is less than the preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be simultaneously in the consensus stage in the computer network.

In some embodiments, the apparatus further includes: a consensus module, which undertakes consensus for the pending consensus request included in the new subset; an inbound link module, wherein when the preset conditions are satisfied, writing the consensus results of the pending consensus requests included in the new subset into the blockchain to conclude the consensus stage.

In a fourth aspect, the embodiments of the present disclosure provide an electronic device, comprising: a processor; and a storage device that is arranged to store computer executable instructions, and the executable instructions cause the processor to execute the following operation when they are executed: determining a pending request set, the pending request set including one or more pending consensus requests; determining a number of subsets that are in a consensus stage, wherein the subsets comprise the pending consensus requests that are obtained from the pending request set; when the number of subsets that are in the consensus stage is less than the preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be simultaneously in the consensus stage in the computer network.

In a fifth aspect, the embodiments of the present disclosure provide an electronic device, comprising: a processor and a storage device that is arranged to store computer executable instructions, and the executable instructions cause the processor to execute the following operation when they are executed: determining a pending request set, the pending request set including one or more pending consensus requests; after receiving a consensus proposal for a new subset, determining whether a number of subsets that are in the consensus stage is less than the preset concurrent number of the computer network, wherein the subsets comprise the pending consensus requests obtained from the pending request set by a primary node; if the number of subsets that are in the consensus stage is less than the preset concurrent number of the computer network, entering the new subset to the consensus stage to process the pending consensus requests.

According to a sixth aspect, a system comprises a processor and a non-transitory computer-readable storage medium stores instructions that, when executed by the processor, cause the processor to perform a method for processing a consensus request in a computer network, the method comprising: determining a pending request set, the pending request set including one or more pending consensus requests; determining a number of subsets that are in a consensus stage, wherein the subsets comprise the pending consensus requests that are obtained from the pending request set; and when the number of subsets that are in the consensus stage is less than a preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be simultaneously in the consensus stage in the computer network.

According to a seventh aspect, a system comprises a processor and a non-transitory computer-readable storage medium stores instructions that, when executed by the processor, cause the processor to perform a method for processing a consensus request in a computer network, the method comprising: determining a pending request set, the pending request set including one or more pending consensus requests; after receiving a consensus proposal for a new subset, determining whether a number of subsets that are in the consensus stage is less than a preset concurrent number of the computer network, wherein the subsets comprise the pending consensus requests obtained from the pending request set by a primary node; and if the number of subsets that are in the consensus stage is less than the preset concurrent number of the computer network, entering the new subset to the consensus stage to process the pending consensus requests.

At least one of the above-described technical solutions adopted in the embodiments of the present disclosure can achieve the following beneficial effects:

On the one hand, a batch of pending consensus requests obtained from the pending request set forms a subset, and with the subset as the unit, a consensus proposal to this batch of requests is initiated, and this is conducive to improving the processing efficiency of the consensus request.

On the other hand, a preset concurrent number is set in the computer network, and this allows a plurality of subsets to be in the consensus stage and conduct the processing of the consensus request, and thereby makes it possible for the computer network to process in parallel a plurality of pending processing requests, and thus it is conducive to improving the processing efficiency of consensus requests and enhancing the processing performance of the computer network.

BRIEF DESCRIPTION OF THE DRAWINGS

The figures described here are used to provide a further understanding of the present disclosure. The exemplary embodiments of the present disclosure and descriptions thereof are used to explain the present disclosure, and do not constitute improper limitations to the present disclosure.

FIG. 3 is a schematic structural diagram of an apparatus for processing a consensus request in a blockchain consensus network according to various embodiments of the present disclosure.

DETAILED DESCRIPTION

To make the technical solutions of this application more comprehensible for people skilled in the art, the technical solutions in the implementations of this application are clearly and completely provided in the following with reference to the accompanying drawings. Apparently, the implementations to be presented are merely a part rather than all of the implementations. All other implementations obtainable by people of ordinary skill in the art based on the disclosed implementations without making creative efforts shall fall within the protection scope of the present disclosure.

A detailed description of the technical solution provided by the embodiments of this disclosure is provided below with reference to the figures. Various methods described below may be implemented by one or more nodes of a computer network (e.g., by a processor).

Figure 1:
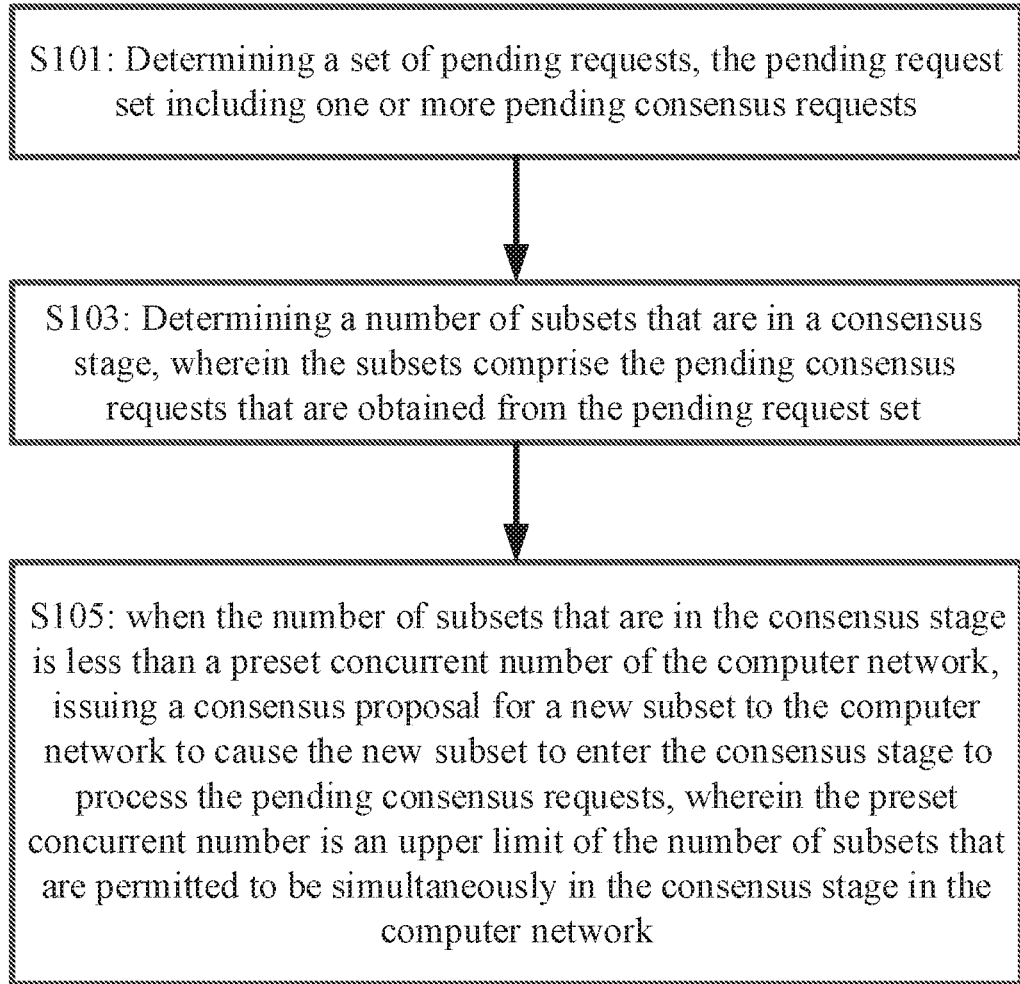
FIG. 1 is a schematic flowchart of a method for processing a consensus request in a blockchain consensus network according to various embodiments of the present disclosure.

Referring to FIG. 1, the embodiments of the present disclosure provide a method for processing a consensus request in a computer network (e.g., a consensus network or a blockchain consensus network), including:

S101: determining a pending request set, the pending request set including one or more pending consensus requests;

S103: determining a number of subsets that are in a consensus stage, wherein the subsets comprise the pending consensus requests that are obtained from the pending request set;

S105: when the number of subsets that are in the consensus stage is less than a preset concurrent number of the computer network, issuing a consensus proposal for a new subset to the computer network to cause the new subset to enter the consensus stage to process the pending consensus requests, wherein the preset concurrent number is an upper limit of the number of subsets that are permitted to be simultaneously in the consensus stage in the computer network. The method and various other steps below may be implemented by a processor.

In some embodiments, the consensus network can be understood as a network comprising multiple nodes that participate in the consensus process in the blockchain system. In a consensus network, there is only one primary node at one time, which is responsible for retrieving the pending consensus requests to form subsets, numbering and sorting the subsets, and then issuing consensus proposals for these subsets in succession in order to further complete the consensus for the pending consensus requests. The embodiment shown in FIG. 1 may be implemented by a primary node (e.g., a processor of a computer) in a consensus network, and illustrates a method for how to initiate a consensus proposal and then complete consensus request processing.

In the consensus network referred to in the embodiments of this present disclosure, the processing of consensus requests can be carried out with reference to a mechanism such as the three-stage consensus (including the pre-preparation stage, preparation stage, and commitment stage). After a consensus is proposed for a subset of the pending consensus requests, the subset will enter the consensus stage; when the subset is in the consensus stage, the consensus network conducts consensus on pending consensus requests in the subset; when preset conditions are satisfied, for example, when the determined consensus results are already obtained for all pending consensus requests in the subset, the consensus results for the pending consensus requests in the subset are written into the blockchain, and at this point the subset finishes the consensus stage, and the processing of the pending consensus requests in the subset is also completed.

For example, one or more client terminals (also referred to as clients) of the blockchain system send the consensus requests pending execution to nodes that provide consensus services in the blockchain, and these nodes that provide consensus services form the consensus network, and can also be called replica nodes (also referred to as replicas) in the consensus network. Each node may comprise a computing device such as a computer. The computer may comprise a processor and a non-transitory computer-readable storage medium storing instructions. The consensus requests pending execution are used to request that the replicas in the consensus network carry out consensus for the corresponding matters and create consensus results, and then write the consensus results into the blockchain. Each replica in the consensus network will receive the pending consensus request(s) sent by the client(s). Each replica comprises a primary node (also referred to as primary) of the current moment and backup nodes (also referred to as backups, which are replicas other than the primary node in the consensus network), and these nodes can perform a format check for a received pending consensus request, and if the format check is passed, the pending consensus request is stored in the pending request set, and can be denoted as P. Further, the set of pending requests may be cached in the primary node's cache pool.

In some embodiments, the primary node in the consensus network is not unchangeable, and it is possible to use a view switching protocol (also referred to as a view change protocol) to switch among consensus nodes (i.e., replicas). For example, the protocol can stipulate the time for each replica node to act as a primary node, and periodically change the primary node. The protocol can also allow a replica acting as a backup for the current moment to submit a switching view application under certain conditions. For example, when it is believed that the primary node is malicious, an error occurred, or when it is detected by the timeout mechanism that the primary node is down, a backup node can trigger the view change protocol to select a new primary node. When an application targeting this switching view reaches a consensus in the consensus network, the primary node can be changed through view switching. The correspondence relationship between the views and the primary node may be determined by the view switching protocol. For example, the view switching protocol can stipulate that the view numbered 1 corresponds to the replica numbered 1, and the view numbered 2 corresponds to the replica numbered 2, and so forth; when it is switched to the view numbered 1, the replica numbered 1 acts as the primary node, and so on.

After the primary node executes step S101 to determine the set of pending requests, it can further execute step S103, and determine the number of subsets that are in the consensus stage. Here, the subsets may comprise pending consensus requests obtained from a set of pending requests. After the primary node executes step S101, a batch of pending consensus requests may be obtained (also referred to as retrieving) from the pending request set P to form the subset. During retrieving, certain preset rules may be followed. For example, it is possible to stipulate the number of retrieval requests, and to retrieve 100 pending consensus requests each time; and it is possible to stipulate an average number of pending consensus requests retrieved from multiple cache pools. The specific rules for retrieving can be adjusted through the configuration of the replica, and the embodiments of this disclosure do not place limitations on this.

In some embodiments, after a given pending consensus request is retrieved from a set of pending requests to form a subset, it is possible to delete the pending request from the set of pending requests, and it is also possible to position it with identifying information so that it is not retrieved again to form another subset, and thereby to avoid repeated processing from being performed for consensus requests whose processing is pending.

When step S103 is executed and the number of subsets that are in the consensus stage is determined, there are many feasible solutions. For example, a counter can be set up, and when a given subset enters the consensus stage, the value of the counter is incremented by one; when a subset finishes the consensus stage, 1 is subtracted from the value of the counter. Therefore, by reading the value of the counter, it is possible to determine the number of subsets that are in the consensus phase, and then it is possible to perform the subsequent steps to determine whether it is possible to initiate a consensus proposal.

In some embodiments, the subsets can be labeled by continuously and monotonically increasing numbers, and to the number of subsets that are in the consensus stage can be determined based on the numerical values. For example, after obtaining the pending consensus requests from the pending request set to form a subset, serial numbers are then assigned to the subsets, and the serial numbers are continuously and monotonically increasing natural numbers, that is, dense natural numbers.

In some embodiments, during the process of forming the subset with the pending consensus requests that are retrieved from the set of pending requests, it is possible to directly retrieve pending consensus requests according to certain rules after the set of pending requests have been determined to form a plurality of subsets, which may be stored in a cache for reading. At this time, it is possible to assign to the plurality of subsets continuously and monotonically increasing natural numbers as the serial numbers of the subsets. When a new consensus proposal is initiated for a new subset, the initiation can be based on the order of precedence of the serial numbers, that is, the serial number of a subset of a consensus proposal with a later consensus proposal initiation is greater than the serial number of a consensus proposal with an earlier consensus proposal initiation by one. Correspondingly, when a new consensus proposal is initiated, one can be added to the serial number of the latest subset for which a consensus has been proposed (i.e., a second serial number introduced shortly thereafter) as the serial number of the new subset; and then the new subset is determined based on the serial number of the new subset.

During the process of forming the subset by the pending consensus requests retrieved from the set of pending requests, it is also possible to retrieve the pending consensus requests to form a new subset and to initiate a consensus proposal for the new subset, when the conditions of the new consensus proposal that is initiated are met. At this time, after the new subset is formed, one may be added to the serial number of the latest subset for which a consensus has been proposed (i.e., a second serial number introduced shortly thereafter) as the serial number of the new subset. Compared with the method of retrieving requests to form subsets described above, this method may be a preferred option since the complexity is lower.

After performing numbering with the continuously and monotonically increasing numbers for the subsets, the above-described step S103 can include:

determining a first serial number based on the serial numbers of the subsets that have completed the consensus stage; and determining a second serial number based on the serial numbers of the subsets that have already entered the consensus stage;

determining the number of subsets that are in the consensus stage based on the first serial number and second serial number.

Further, determining the first serial number based on the serial numbers of the subsets that have completed the consensus stage may include: determining the largest serial number of the serial numbers of the subsets that have completed the consensus stage to be the first serial number; and determining the second serial number based on the serial numbers of the subsets that have entered the consensus stage, and may include: determining the largest serial number of the serial numbers of the subsets that have entered the consensus stage to be the second serial number.

Determining the number of subsets that are in the consensus stage based on the first serial number and the second serial number may include: determining a difference between the first serial number and the second serial number to be the number of subsets that are in the consensus stage.

In some embodiments, in the course of determining the first serial number and the second serial number, no specific order is required, and the determination may be performed in parallel, and it may also be done serially in any order preferred.

In some embodiments, a subset that has already completed the consensus stage means that a consensus has already been successfully achieved for the pending consensus requests in the subset, and moreover, the results of the consensus have already been successfully entered into the chain, that is, the pending consensus requests in the subset have already been processed completely. At this time, in order to ensure the consistency of the blockchain data, before the consensus results of a given subset are written into the blockchain, it is necessary to determine the preset conditions, for example, each replica of the consensus network must ensure that the subsets having serial numbers prior to the serial number of the given subset have already completed the consensus stage and completed entering the consensus results into the chain. Therefore, it is possible to determine the largest serial number of the serial numbers in a plurality of subsets that have already completed the consensus stage, so that the first serial number can represent the serial number of the subset that is known by the primary node and for which a consensus has most recently been successfully achieved and of which consensus results have already been successfully entered into the chain.

In some embodiments, a subset that has already entered the consensus stage means that a consensus proposal has already been initiated for the pending consensus requests of the subset, and the pending consensus requests are all currently in the consensus stage. As indicated above, since consensus proposals are initiated in succession for the corresponding subsets in order of the size of the serial numbers, it is possible to determine the largest serial number of the serial numbers of the plurality of subsets that have already entered the consensus stage as the second serial number, so that the second serial number represents the subset known by the primary node and for which a consensus proposal has most recently been initiated.

Therefore, the difference between the above-described first serial number and second serial number indicates the number of subsets for which consensus requests have already been initiated but for which consensus request processing has not been completed yet, and it is thereby possible to determine the difference as the number of subsets that are in the consensus stage.

After step S103 is executed to determine the number of subsets that are in the consensus stage, the primary further determines whether the number of subsets that are in the consensus stage is less than a preset concurrent number of the consensus network. If the number of subsets in the consensus stage is equal to the present concurrent number of the consensus network, this indicates that the consensus network is unable to accept a new subset entering the consensus stage, and the primary node will wait until the conditions are satisfied and initiate a consensus proposal for the new subset. If the number of subsets in the consensus stage is less than the present concurrent number of the consensus network, this indicates that the consensus network can still accept a new subset entering the consensus stage, and thus the primary node can determine the new subset and the serial number of the new subset based on the above-second serial number, and then the primary node can initiate a consensus proposal for the new subset to the consensus network to cause the new subset to enter the consensus stage. A person with ordinary skill in the art can understand that under normal circumstances, no situation in which "the number of subsets in the consensus stage is greater than the present concurrent number of the consensus network" will occur in the consensus network. Once such a situation occurs, it means that an abnormal state like a serial number assignment error may have occurred in the primary node, or indicates some kind of anomaly already existing in the consent network, and then each replica in the consensus network can trigger the view switching protocol to carry out switching of the primary node, and can also take other remedial measures.

In some embodiments, when it comes to the other replicas that serve as backups, a consensus proposal initiated by the primary node can be verified. During verification, it is also necessary to determine whether the number of subsets that are in the consensus stage is less than the preset concurrent number of the consensus network. During implementation, a backup node can be determined and verified based on the serial number of the subset known by the primary node and for which a consensus proposal has most recently been initiated (equivalent to the second serial number) and the serial number of the subset for which a consensus has most recently succeeded and of which consensus results have already successfully entered into the chain (equivalent to the first serial number).

In some embodiments, when the primary node initiates a consensus proposal, the primary node shall broadcast the consensus proposal to all replicas in the consensus network in the form of valid consensus proposal information, and thereby initiate this round of consensus with the focus on the new subset. A consensus proposal sent by the primary node may include such contents as the signature information of the primary node, the serial number of the subset, and an information abstract of the subset for the replicas that receive the consensus proposal to conduct a check for the proposal.

The above description has introduced from different perspectives various alternative specific implementation manners of the embodiments of the present disclosure when a new consensus proposal is initiated. In some embodiments, when the requests in the pending request set have not all been completely processed, the above-described steps S103 and S105 may be executed cyclically, that is, when executing step S105 to initiate a consensus proposal for a new subset to the consensus network to cause the new subset to enter the consensus stage, the primary node can return to execute step S103, and then re-determine the number of subsets that are in the consensus stage to help determine whether to initiate a new consensus proposal for a new subset, and so forth, until all of the pending consensus requests have been completely processed and consensus results have been successfully obtained and successfully entered into the chain. Similarly, after the consensus results for the pending consensus requests contained in the new subset are written into the blockchain, the number of subsets that are in the consensus stage may be re-determined to help determine whether to accept the new subset and then whether to initiate a new consensus proposal for the new subset.

Exemplary processes for the primary node to determine whether it is possible to issue a new consensus proposal to a new subset are provided below. Assume that 5 is obtained for the preset concurrent number (denoted as w), and 91 is obtained for the serial number of the subset (denoted as e) for which a consensus has most recently been successfully reached and of which consensus results have been written into the chain (this can be understood to mean that all of the pending consensus requests in the subset have already been successfully executed), and that the serial number of the subset of the consensus proposal that has most recently been initiated is denoted as p, the condition that "the number of subsets in the consensus stage is less than the present concurrent number of the consensus network" can be expressed as: $e \leq p < (e+w)$. Where w=5 and e=91, to satisfy the condition $e \leq p < (e+w)$, the possible values of p are 91, 92, 93, 94, and 95, which means that the consensus proposal allowed to be initiated by the consensus network at this time can be a subset having a serial number from the following numerical values: 92, 93, 94, 95, and 96. Assuming that the consensus network simultaneously initiates consensus proposals for subsets corresponding to the five serial numbers, and that consensus has already been successfully achieved for all of the consensus proposals of the subsets having serial numbers 93, 94, 95, and 96, but consensus is still being performed in the consensus stage for the subset having serial number 92 since the processing is relatively slow; if so, then at this time the subsets having serial numbers 93, 94, 95, and 96 may wait until after a consensus has been successfully achieved for the subset having serial number 92 and the consensus results of which have been successfully written into the chain, and then the consensus results of the subsets having serial numbers 93, 94, 95, and 96 can be written into the blockchain according to the order of the serial numbers. Before this, the value of e is still 91, and a consensus proposal cannot be initiated for the subset whose serial number is 97, and it is necessary to wait.

Further, when the consensus results for the pending consensus requests contained in a new subset are written into a blockchain, in order to ensure the consistency of the blockchain data, the consensus results must be written into the blockchain according to the time sequence of the pending consensus requests that are received. In other words, when the consensus results contained in a plurality of subsets are written into a blockchain, if the method (continuously and monotonically increasing) in the above illustration is employed to perform the assignment of serial numbers, the consensus results corresponding to the subset having a serial number that comes first shall be written in first, and then the consensus results corresponding to the subset having a serial number that comes later shall be written in afterwards; for each subgroup, the consensus results corresponding to the requests are written into the blockchain according to the time sequence of the pending consensus requests within their subsets;

In the above-described embodiments of the present disclosure, a batch of pending consensus requests obtained from the pending request set form a subset, and with the subset as a unit, a consensus proposal to this batch of requests is initiated, and this is conducive for improving the processing efficiency of the consensus request. Further, a preset concurrent number is set in the consensus network, which allows a plurality of subsets to be in the consensus stage to conduct the processing of the consensus requests, and makes the consensus network able to process in parallel a plurality of pending consensus requests, and parallel out-of-order processing is allowed for pending consensus requests of different subsets, and thereby improving the processing efficiency of consensus requests and enhancing the processing performance of the consensus network.

Figure 2:
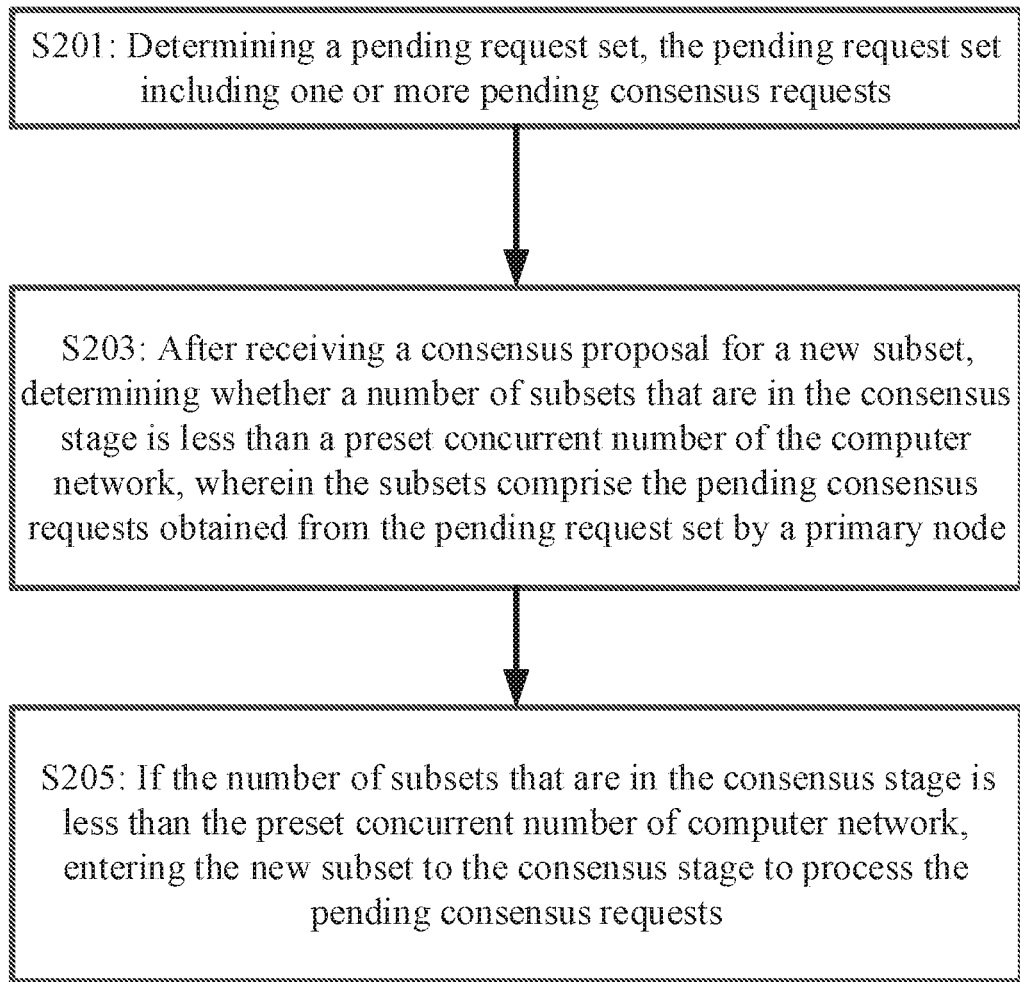
FIG. 2 is a schematic flowchart of an another method for processing a consensus request in a blockchain consensus network according to various embodiments of the present disclosure.

The embodiments of the present disclosure further provide a method for processing a consensus request in a computer network (e.g., a consensus network or a blockchain consensus network), which is applicable to each replica participating in the consensus; the specific flow is as shown in FIG. 2, including:

S201: determining a pending request set, the pending request set including one or more pending consensus requests;

S203: after receiving a consensus proposal for a new subset, determining whether a number of subsets that are in the consensus stage is less than a preset concurrent number of the computer network, wherein the subsets comprise the pending consensus requests obtained from the pending request set by a primary node;

S205: if the number of subsets that are in the consensus stage is less than the preset concurrent number of the computer network, entering the new subset to the consensus stage to process the pending consensus requests. The method and various other steps below may be implemented by a processor.

Each replica that participates in the consensus services, similar to the above-described primary node, will all receive the pending consensus requests sent by the client. After each replica has conducted a format check for the received request information, the pending consensus requests that pass the format check are placed in the pending request set.

Each replica node may check whether itself is the primary node of the consensus network at the moment, and if itself is the primary node, the replica node may further determine whether to initiate a new consensus request with reference to the method shown in FIG. 1; if itself is not the primary node, the replica node serving as a backup will wait for the consensus proposal initiated by the primary node.

After the replica node receives the consensus proposal initiated by the primary node for a new subset, the replica node will execute step S203 and determine whether the number of the subsets in the consensus stage is less than the preset concurrent number of the consensus network, that is, after a new consensus proposal has been received, the replica node will also verify whether the initiation for the consensus proposal is valid and correct, and this is conducive to guaranteeing the accuracy of the consensus network. Before this, the number of subsets that are currently in the consensus state may be determined, and the determination method can be the same as the method by which the primary node determines the number of subsets that are in the consensus mode before issuing the consensus request; the only difference is that each replica node calculates based on the circumstances known by itself respectively, and this will not be described here.

In some embodiments, after receiving the consensus proposal sent by the primary node, the replica node may also determine whether the format of the received consensus proposal is valid, and whether the consensus proposal satisfies the conditions of the three-phase consensus protocol for accepting the proposal, for example, whether the signature of the primary node is valid, whether consensus proposals with the same serial number but different information abstracts have been accepted, etc. If each check is passed, the new subset enters the consensus stage, and processing of the consensus requests is conducted.

In some embodiments, the new subset enters the consensus stage, and processing of the consensus request is conducted, and this may include:

carrying out consensus for the pending consensus requests contained in the new subset;

when the preset conditions are satisfied, for example, if the subsets having serial numbers prior to the serial number of the new subset have already completed the consensus stage, consensus results of the pending consensus requests contained in the new subset will be written into the blockchain for the consensus stage, and the consensus stage concludes.

For example, in the process of carrying out consensus for a pending consensus request contained in a new subset, a three-stage consensus mechanism can be implemented. The three-stage consensus conducted for each pending consensus request may be conducted sequentially according to the sequence of the three stages to ensure the accuracy of the consensus results.

The method for processing a consensus request in the blockchain consensus network provided by the embodiments of the present disclosure is applicable to the Byzantine Fault Tolerance State Machine Replication algorithm. For the general purpose Byzantine Fault Tolerance State Machine Replication, the most important component thereof is the realization of a Byzantine Fault Tolerance Total Order Broadcast protocol. This is because the state machine replica model needs to satisfy four basic properties:

1. For any two correct replicas r and r', if they both apply operation o to state s, r and r' will both arrive at state s'.

2. The states of any two correct replicas r and r' both start from $s_0$

3. Any two correct replicas r and r' both execute the same operation sequence: $o_0, o_1, \ldots o_i$.

4. Operation requests from the correct client will always be executed.

Property 3 and Property 4 require that the blockchain consensus network implements a whole-sequence broadcast protocol.

By adopting the embodiments of the present invention, it is possible to achieve a full-sequence broadcast protocol that satisfies the requirements, and the method is roughly as follows:

1. One unique serial number is assigned to each subset that is retrieved out from the pending request set and that comprises correct pending consensus requests, and the serial number is a dense natural number and satisfies the continuously and monotonically increasing condition;

2. For every <subset, serial number> pair, when the preset condition for the concurrent number of the consensus network is satisfied, the three-stage consensus is initiated in succession to ensure that all correct replicas reach consensus for each pending consensus request in the <subset, serial number> pair.

3. For all of the <subset, serial number> pairs that have reached a consensus, all of the correct replicas write the results of the consensus into the blockchain based on the corresponding requests executed in sequence based on the serial numbers.

For example, in some embodiments, each pending consensus request in the subset for which a consensus proposal has already been initiated may adopt the following process of three-stage consensus to obtain the consensus as a result. The corresponding process can be briefly described as follows:

1. Pre-Preparation Stage

The client broadcasts the pending consensus request to the replicas of the entire network. The current primary assigns a subset to the request sent by the client, and correspondingly assigns the serial number of the subset. Further, the current primary broadcasts a PRE-PREPARE message to the replicas of the entire network, and this may be equivalent to the consensus proposal described in the embodiments of the present disclosure.

2. Preparation Stage

After the replicas have received the PRE-PREPARE message sent by the current primary, the message is verified according to certain rules and a choice is made about whether to accept it. If it is accepted, the replica broadcasts a corresponding PREPARE message to the entire network; at the same time, the replica waits and collects preparation messages for the other replicas of the entire network. When the replica collects valid PREPARE messages that meet a certain quantity, this is referred to as the replica having obtained a "prepared certificate".

3. Commitment Stage

The replica node that has obtained a "prepared certificate" immediately broadcasts a corresponding COMMIT message to the entire network; at the same time, the replica node waits and collects the COMMIT messages of other replicas of the entire network. When the replica node collects a valid COMMIT message that satisfies a certain quantity, this replica node is referred to as having obtained a "committed certificate," the corresponding client requests can be executed by the replica node at this time.

The embodiments of the present disclosure adopt the methods described above to process consensus requests in a computer network (e.g., a blockchain consensus network), and increase the processing efficiency of the consensus requests and improve the processing performance of the consensus network.

The embodiments of the present disclosure further provide an apparatus device for processing a consensus request in a blockchain consensus network, as shown in FIG. 3, comprising:

a set determining module 101 configured to determine a set of pending requests, the pending request set including one or more pending consensus requests;

a quantity determining module 103 configured to determine a number of subsets that are in a consensus stage, wherein the subsets comprise pending consensus requests that are obtained from the pending request set;

a determination module 105 configured to determine whether the number of subsets that are in the consensus stage is less than a preset concurrent number of the consensus network.

Figure 4:
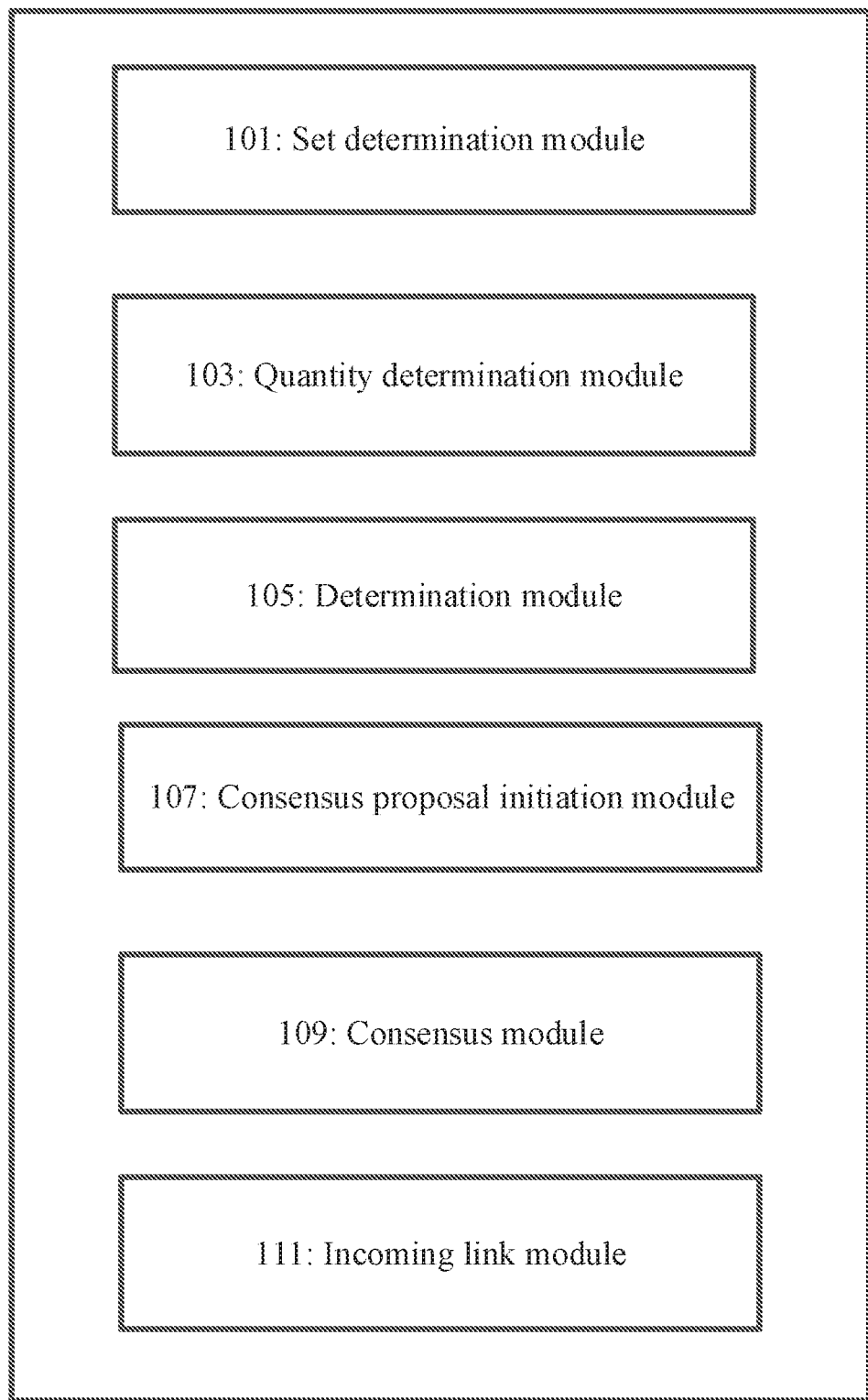
FIG. 4 is a schematic structural diagram of an apparatus for processing a consensus request in a second blockchain consensus network according to various embodiments of the present disclosure.

Further, the above-described device may also include, as shown in FIG. 4:

a consensus proposal initiation module 107 configured to, wherein when the number of subsets that are in the consensus stage is less than the preset concurrent number of the consensus network, issue a consensus proposal for a new subset to the consensus network to cause the new subset to enter the consensus stage to process the pending consensus requests, wherein the preset concurrent number is an upper limit of the number of subsets that are permitted to be simultaneously in the consensus stage in the consensus network.

Further, the above-described device may also include, as shown in FIG. 4:

a consensus module 109 configured to perform consensus procedure for the pending consensus requests included in the new subset;

an inbound link module 111 configured to, when the preset conditions are satisfied, write consensus results of the pending consensus requests included in the new subset into a blockchain to conclude the consensus stage.

Since the above-described apparatuses and the method introduced in the foregoing embodiments correspond to one another, the related descriptions in the foregoing embodiments are all applicable to the apparatus for processing consensus request in the blockchain consensus network, and this will not be discussed further here.

In some embodiments, the various modules and units of the apparatuses in FIG. 3 and FIG. 4 may be implemented as software instructions. That is, the apparatuses in FIG. 3 and FIG. 4 may each comprise a processor and a non-transitory computer-readable storage medium storing instructions that, when executed by the processor, cause one or more components of the apparatus (e.g., the processor) to perform various steps and methods of the modules and units described above. The apparatuses in FIG. 3 and FIG. 4 may each be referred to as a system for processing a consensus request in a computer network.

Figure 5:
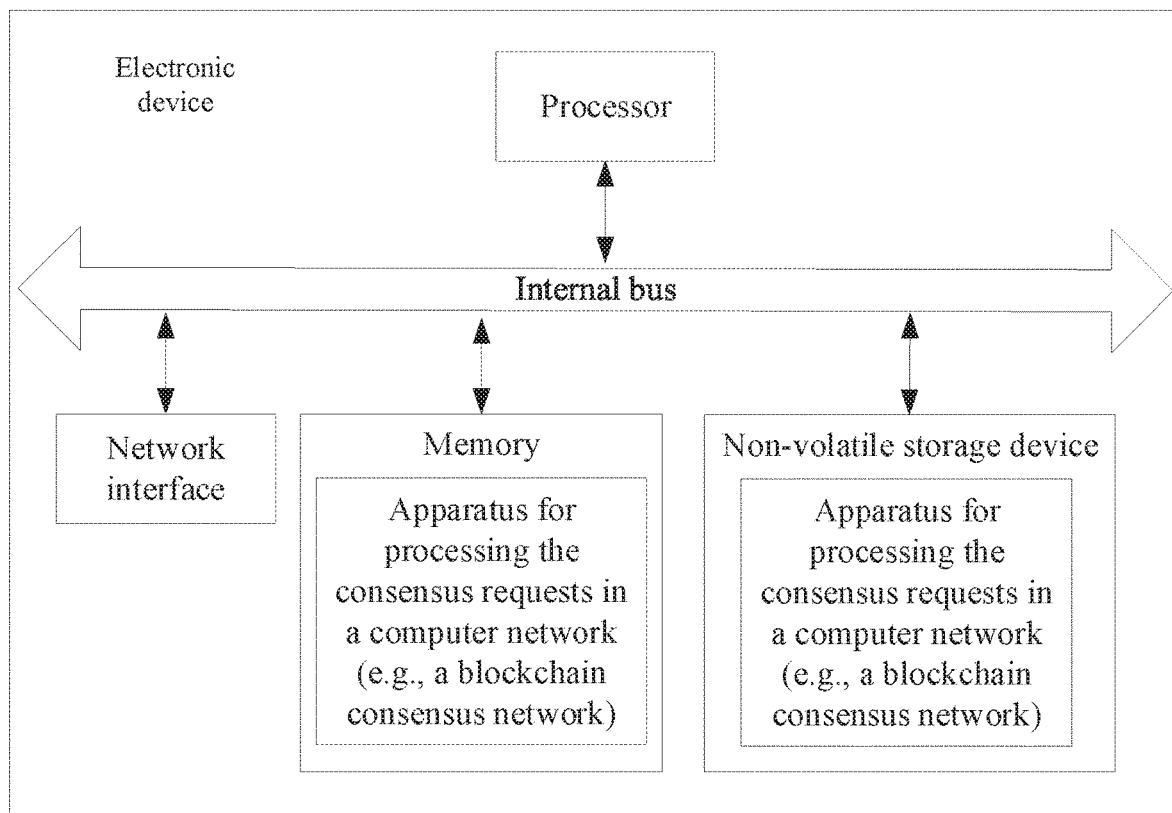
FIG. 5 is a schematic structural diagram of an electronic device according to various embodiments of the present disclosure.

FIG. 5 is a schematic structural diagram of an electronic device according to various embodiments of the present disclosure. Referring to FIG. 5, at the hardware level, the electronic device comprises a processor, and optionally may also comprise an internal bus, a network interface, and a storage device. Here, the storage device may include internal memory, for example, a high-speed random access storage device (random access memory, RAM), and may also include a non-volatile storage device (non-volatile memory), for example, at least one disk storage device. Of course, the electronic device may also include the hardware required by other services.

The processor, storage device, and network interfaces may be connected to each other through an internal bus, and the internal bus may be an ISA (industry standard architecture) bus, a PCI (peripheral component interconnect) bus, or an EISA (extended industry standard architecture) bus, etc. The buses can be divided into address buses, data buses, control buses, and so on. For ease of illustration, only one bidirectional arrow is used in FIG. 5, but this does not mean that there is only one bus or one type of bus.

A storage device may be used for storing programs. For example, the program may include program codes that include computer operation instructions. The storage device can include an internal memory and a non-volatile storage device and provide instructions and data to the processor.

The processor reads the corresponding computer program from the non-volatile storage device into the memory and then runs it, and thus forms a device that processes consensus requests in a computer network at the logical level. The processor executes the program stored in the memory and is used to execute the following operations:

determining a set of pending requests, the pending request set including one or more pending consensus requests;

determining a number of subsets that are in a consensus stage, wherein the subsets comprise the pending consensus requests that are obtained from the pending request set;

when the number of subsets that are in the consensus stage is less than a preset concurrent number of the consensus network, issuing a consensus proposal for a new subset to the consensus network to cause the new subset to enter the consensus stage to process the pending consensus requests, wherein the preset concurrent number is an upper limit of the number of subsets that are permitted to be simultaneously in the consensus stage in the consensus network.

The method executed by the apparatus for processing consensus requests in a computer network disclosed in the embodiment shown in FIG. 1 may be applied to a processor or achieved by a processor. The processor may be an integrated circuit chip with the ability to process signals. During implementation, each step of the above-described method may be completed by an integrated logic circuit of the hardware in a processor or an instruction in software form. The above-described processor may be a general purpose processor, including a central processing unit (CPU), a network processor (NP) and the like; it may also be a digital signal processor (DSP), an application specific integrated circuit (ASIC), a field-programmable gate array (FPGA) or other programmable logic device, a discrete gate or transistor logic device or a discrete hardware component. It is possible to achieve or execute each one of the methods, steps and logic blocks disclosed in the embodiments of this disclosure. A general purpose processor may be a microprocessor or the processor may be any conventional processor, etc. The steps of the method disclosed in conjunction with the embodiments of the present disclosure may be manifested directly as a hardware decoding processor for execution thereof, or using a combination of hardware and software modules in a decoding processor for execution thereof. The software module may be located in a storage device that is mature in the field, such as random access memory, flash memory, read-only memory, programmable read-only memory, or electrically erasable programmable memory, registers, etc. The storage medium is located in the storage device, and the processor reads the information in the storage device and completes the steps of the above-described method in combination with the hardware.

The electronic device may also execute the method executed by the apparatus for processing the consensus requests in a computer consensus network in FIG. 1, and achieve the functions of the embodiments shown in FIG. 1 of the apparatus for processing the consensus requests in the computer network, and it will not be discussed further here.

The embodiments of the present disclosure further provide a computer-readable storage medium; the computer-readable storage medium stores one or more programs; the one or more programs include instructions; and when the instructions are executed by an electronic device that includes a plurality of application programs, the instructions can cause the electronic device to execute the method executed by the apparatus for processing the consensus requests in a computer consensus network in the embodiment shown in FIG. 1. For example, a non-transitory computer-readable storage medium may store instructions that, when executed by the processor, cause the processor to perform a method for processing a consensus request in a consensus network, the method comprising:

determining a set of pending requests, the pending request set including pending consensus requests;

determining a number of subsets that are in the consensus stage, wherein the subsets comprise pending consensus requests that are obtained from the pending request set;

when the number of subsets that are in the consensus stage is less than a preset concurrent number of the consensus network, issuing a consensus proposal for a new subset to the consensus network to cause the new subset to enter the consensus stage to process the pending consensus requests, wherein the preset concurrent number is an upper limit of the number of subsets that are permitted to be simultaneously in the consensus stage in the consensus network.

Figure 6:
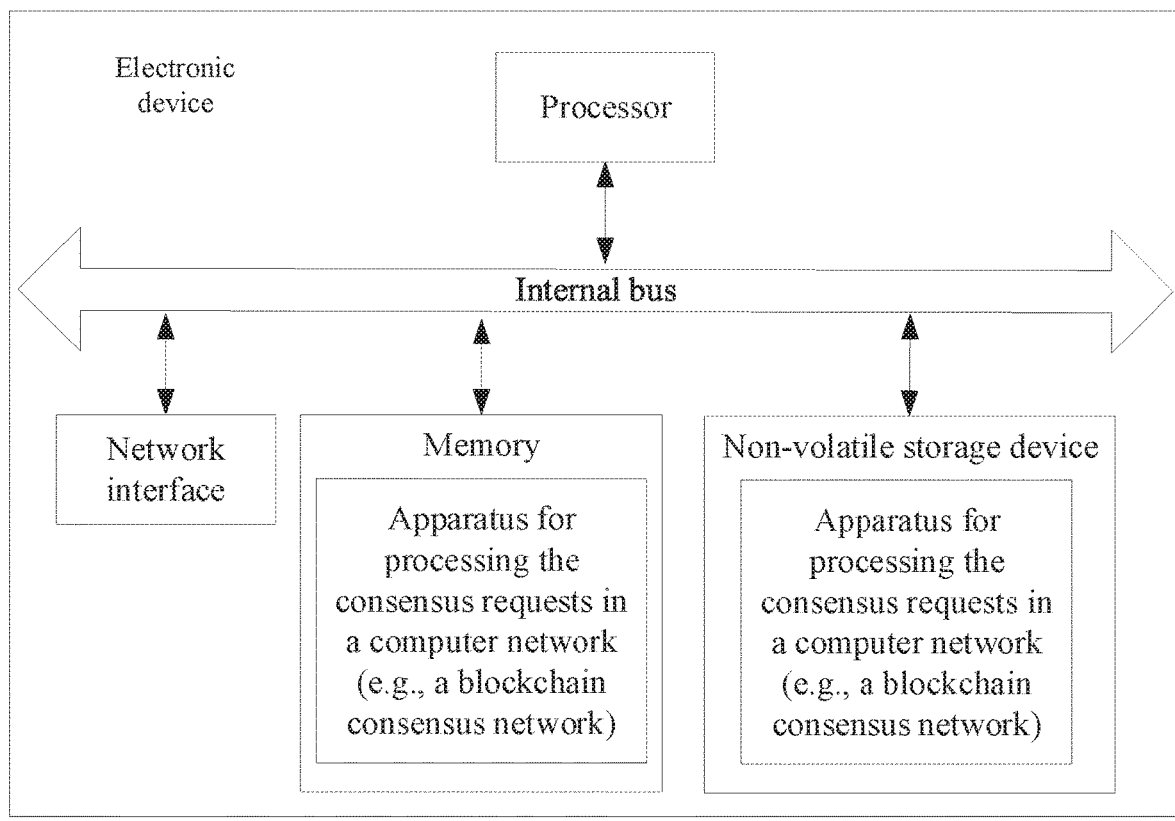
FIG. 6 is a schematic structural diagram of another electronic device according to various embodiments of the present disclosure.

FIG. 6 is a schematic structural diagram of an electronic device according to various embodiments of the present disclosure. Referring to FIG. 6, at the hardware level, the electronic device comprises a processor, and optionally may also comprise an internal bus, a network interface, and a storage device. Here, the storage device may include an internal memory, for example, a high-speed random access storage device (random access memory, RAM), and may also include a non-volatile storage device (non-volatile memory), for example, at least one disk storage device. Of course, the electronic device may also include the hardware required by other services.

The processor, storage device, and network interfaces may be connected to each other through an internal bus, and the internal bus may be an ISA (industry standard architecture) bus, a PCI (peripheral component interconnect) bus, or an EISA (extended industry standard architecture) bus, etc. The buses can be divided into address buses, data buses, control buses, and so on. For ease of illustration, only one bidirectional arrow is used in FIG. 6, but this does not mean that there is only one bus or one type of bus.

A storage device may be used for storing programs. For example, the program may include program codes that includes computer operation instructions. The storage device can include an internal memory and a non-volatile storage device and provide instructions and data to the processor.

The processor reads the corresponding computer program from the non-volatile storage device into the memory and then runs it, and thus forms a device that processes consensus requests in a computer network at the logical level. The processor executes the program stored in the memory and is used to execute the following operations:

determining a set of pending request, the pending request set including one or more pending consensus requests;

after receiving a consensus proposal for a new subset, determining whether a number of subsets that are in the consensus stage is less than a preset concurrent number of the consensus network, wherein the subsets comprise the pending consensus requests obtained from the pending request set by a primary node;

if the number of subsets that are in the consensus stage is less than the preset concurrent number of the consensus network, entering the new subset to the consensus stage to process the consensus request.

The method executed by the apparatus for processing consensus requests in a computer consensus network disclosed in the embodiment shown in FIG. 2 may be applied to a processor or achieved by a processor. The processor may be an integrated circuit chip with the ability to process signals. During implementation, each step of the above-described method may be completed by an integrated logic circuit of the hardware in a processor or an instruction in software form. The above-described processor may be a general purpose processor, including a central processing unit (CPU), a network processor (NP) and the like; it may also be a digital signal processor (DSP), an application specific integrated circuit (ASIC), a field-programmable gate array (FPGA) or other programmable logic device, a discrete gate or transistor logic device or a discrete hardware component. It is possible to achieve or execute each one of the methods, steps and logic blocks disclosed in the embodiments of this disclosure. A general purpose processor may be a microprocessor or the processor may be any conventional processor, etc. The steps of the method disclosed in conjunction with the embodiments of the present disclosure may be manifested directly as a hardware decoding processor for execution thereof, or using a combination of hardware and software modules in a decoding processor for execution thereof. The software module may be located in a storage device that is mature in the field, such as random access memory, flash memory, read-only memory, programmable read-only memory or electrically erasable programmable memory, registers, etc. The storage medium is located in the storage device, and the processor reads the information in the storage device and completes the steps of the above-described method in combination with the hardware.

The electronic device may also execute the method executed by the apparatus for processing the consensus requests in a computer network in FIG. 2, and achieve the functions of the embodiments shown in FIG. 2 of the apparatus for processing the consensus requests in the computer network, and it will not be discussed further here.

The embodiments of the present disclosure further provides a computer-readable storage medium; the computer-readable storage medium stores one or more programs; the one or more programs include instructions; and when the instructions are executed by an electronic device that includes a plurality of application programs, the instructions can cause the electronic device to execute the method that is executed by the apparatus for processing the consensus requests in the computer network in the embodiment shown in FIG. 2. For example, a non-transitory computer-readable storage medium may store instructions that, when executed by the processor, cause the processor to perform a method for processing a consensus request in a consensus network, the method comprising:

determining a set of pending request, the pending request set including pending consensus requests;

after receiving a consensus proposal for a new subset, determining whether a number of subsets that are in the consensus stage is less than a preset concurrent number of the consensus network, wherein the subsets comprise the pending consensus requests obtained from the pending request set by a primary node;

if the number of subsets that are in the consensus stage is less than the preset concurrent number of the consensus network, entering the new subset to the consensus phase to process the pending consensus requests.

Persons skilled in the art should understand that the embodiments of the present disclosure may be provided as a method, system, or computer program product. Thus, the described apparatus may take the form of an entirely hardware embodiment, an entirely software embodiment, or an embodiment combining software and hardware aspects. Furthermore, the described apparatus may take the form of a computer program product embodied on one or more computer-usable storage media (including but not limited to disk storage devices, CD-ROMs, optical storage devices, etc.) that contain a computer-usable program code therein.

The present disclosure is described with reference to the flowcharts and/or block diagrams of the method, the apparatus (system) and the computer program product according to the embodiments of the present disclosure. Each process and/or block in the flowcharts and/or block diagrams, and combinations of processes and/or blocks in the flowcharts and/or block diagrams, may be achieved by computer program instructions. The computer program instructions may be provided to the processor of a general purpose computer, a special purpose computer, an embedded processor, or other programmable data processing device to generate a machine that causes the generation of instructions by the processor of a computer or other programmable data processing device for use in achieving the apparatus with the functions specified in one or more processes in a flowchart and/or one or more blocks in block diagram.

These computer program instructions may also be stored in a computer readable memory capable of directing a computer or other programmable data processing device to operate in a specific manner so that the instructions stored in the computer readable memory generate a product including an instruction apparatus, and the instruction apparatus can achieve the functions specified in one or more processes in a flowchart and/or one or more blocks in block diagram.

These computer program instructions can also be loaded onto a computer or other programmable data processing device to cause the computer or other programmable data processing device to execute a series of operational steps in order to generate the processing that is achieved by a computer, and thus the instructions executed on the computer or other programmable data processing device provide the steps used to achieve the functions specified in one or more processes in a flowchart and/or one or more blocks in block diagram.

In a typical configuration, the computing device includes one or more processors (CPU), input/output interfaces, network interfaces, and internal memory.

The internal memory may include non-permanent memory in a computer-readable medium, random access memory (RAM) and/or non-volatile memory, such as read-only memory (ROM) or a flash memory (flash RAM). The internal memory is an example of a computer-readable medium.

Computer-readable media include permanent and non-permanent, removable and non-removable media that can be used to realize information storage by any method or technique. The information can be computer readable instructions, data structures, and modules of a program or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only [sic] disc read-only memory (CD-ROM), digital versatile disc (DVD) or other optical storage, magnetic cassette tapes, tape magnetic disk storage, or other magnetic storage devices or any other non-transport media that can be used to store information that can be accessed by a computing device. As defined herein, computer-readable media do not include a temporary computer-readable media (transitory media), for example modulated data signals and carrier waves.

The terms "include", "contain" or any variations thereof intend to cover non-exclusive inclusions, such that the processes, methods, products, or equipment including a series of elements not only include those elements, but also to include other elements that have not been explicitly set forth, or to also include all of the elements that are inherent to such processes, methods, products or equipment. Under circumstances where there is no further limitation, an element limited by the phrase "includes one . . . " does not exclude the existence of additional similar elements in the processes, methods, products, or equipment that contain the element.

Persons skilled in the art should understand that the embodiments of the present disclosure may be provided as a method, system, or computer program product. Thus, the present disclosure can take the form of an entirely hardware embodiment, an entirely software embodiment, or an embodiment combining software and hardware aspects. Moreover, the present disclosure may take the form of a computer program product embodied on one or more computer-usable storage media (including but not limited to a disk storage device, CD-ROM, optical memory, etc.) having computer-usable program code contained therein.

The above embodiments are merely exemplary and are not used to restrict the present disclosure. For a person skilled in the art, the present disclosure may have various changes and variations. Any modification, equivalent replacement, improvement, etc. that is made within the spirit and principle of the present disclosure shall be included in the scope of the claims of the present disclosure.

The invention claimed is:

1. A non-transitory computer-readable storage medium of a node of a blockchain consensus network, the non-transitory computer-readable storage medium storing instructions that, when executed by a processor, cause the processor to perform operations comprising:

forming a plurality of subsets from a set of pending consensus requests received by the node, each of the plurality of subsets comprising one or more separate requests of the pending consensus requests, and a first subset of the subsets comprising at least two of the pending consensus requests;

determining whether a number of subsets that are in a consensus stage is less than a preset maximum number of subsets that are permitted to be simultaneously in the consensus stage in the blockchain consensus network; and in response to determining that the number of subsets that are in the consensus stage is less than the preset maximum number, entering the first subset into the consensus stage by broadcasting a consensus proposal comprising the first subset to one or more nodes of the blockchain consensus network.

2. The non-transitory computer-readable storage medium of claim 1, wherein the operations further comprise: after forming the plurality of subsets, assigning serial numbers to the subsets, wherein the assigned serial numbers are continuously and monotonically increasing natural numbers.

3. The non-transitory computer-readable storage medium of claim 2, wherein the operations further comprise:

determining a first serial number based on one or more serial numbers of one or more subsets that have completed the consensus stage;

determining a second serial number based on one or more serial numbers of one or more subsets that have entered the consensus stage; and determining the number of subsets that are in the consensus stage based on the first serial number and the second serial number.

4. The non-transitory computer-readable storage medium of claim 3, wherein:

determining the first serial number includes: determining a largest serial number of the one or more serial numbers of the subsets that have completed the consensus stage to be the first serial number;

determining the second serial number includes: determining a largest serial number of the one or more serial numbers of the subsets that have entered the consensus stage to be the second serial number; and determining the number of subsets that are in the consensus stage includes: determining a difference between the first serial number and the second serial number to be the number of subsets that are in the consensus stage.

5. The non-transitory computer-readable storage medium of claim 3, wherein entering the first subset into the consensus stage includes: determining the first subset and a serial number of the first subset based on the second serial number.

6. The non-transitory computer-readable storage medium of claim 5, wherein determining the serial number of the first subset includes: incrementing the second serial number by one to serve as the serial number of the first subset.

7. The non-transitory computer-readable storage medium of claim 1, wherein the operations further comprise:

before entering the first subset into the consensus stage, determining the number of subsets that are in the consensus stage; and after entering the first subset into the consensus stage, redetermining the number of subsets that are in the consensus stage.

8. The non-transitory computer-readable storage medium of claim 1, wherein the operations further comprise: after entering the first subset into the consensus stage, performing a consensus process for the pending consensus requests of the first subset; and when one or more conditions are satisfied, concluding the consensus stage with respect to the first subset by writing a consensus result of the consensus process into a blockchain maintained by the blockchain consensus network.

9. The non-transitory computer-readable storage medium of claim 8, wherein the one or more conditions are satisfied when one or more subsets with serial numbers less than a serial number of the first subset have completed the consensus stage.

10. The non-transitory computer-readable storage medium of claim 8, wherein writing the consensus result includes: writing the consensus result into the blockchain according to a time sequence in which the pending consensus requests of the first subset are received.

11. A method, comprising:

forming, by a processor of a node of a blockchain consensus network, a plurality of subsets from a set of pending consensus requests received by the node, each of the plurality of subsets comprising one or more separate requests of the pending consensus requests, and a first subset of the subsets comprising at least two of the pending consensus requests;

determining, by the processor, whether a number of subsets that are in a consensus stage is less than a preset maximum number of subsets that are permitted to be simultaneously in the consensus stage in the blockchain consensus network; and in response to determining that the number of subsets that are in the consensus stage is less than the preset maximum number, entering, by the processor, the first subset into the consensus stage by broadcasting a consensus proposal comprising the first subset to one or more nodes of the blockchain consensus network.

12. The method of claim 11, further comprising: after forming the plurality of subsets, assigning serial numbers to the subsets, wherein the assigned serial numbers are continuously and monotonically increasing natural numbers.

13. The method of claim 12, further comprising:

determining a first serial number based on one or more serial numbers of one or more subsets that have completed the consensus stage;

determining a second serial number based on one or more serial numbers of one or more subsets that have entered the consensus stage; and determining the number of subsets that are in the consensus stage based on the first serial number and the second serial number.

14. The method of claim 13, wherein entering the first subset into the consensus stage includes: determining the first subset and a serial number of the first subset based on the second serial number.

15. The method of claim 11, further comprising:

before entering the first subset into the consensus stage, determining the number of subsets that are in the consensus stage; and after entering the first subset into the consensus stage, redetermining the number of subsets that are in the consensus stage.

16. The method of claim 11, further comprising: after entering the first subset into the consensus stage, performing a consensus process for the pending consensus requests of the first subset; and when one or more conditions are satisfied, concluding the consensus stage with respect to the first subset by writing a consensus result of the consensus process into a blockchain maintained by the blockchain consensus network.

17. A system, comprising:

a processor; and a non-transitory computer-readable storage medium of a node of a blockchain consensus network, the non-transitory computer-readable storage medium storing instructions that, when executed by the processor, cause the processor to perform operations comprising:

forming a plurality of subsets from a set of pending consensus requests received by the node, each of the plurality of subsets comprising one or more separate requests of the pending consensus requests, and a first subset of the subsets comprising at least two of the pending consensus requests;

determining whether a number of subsets that are in a consensus stage is less than a preset maximum number of subsets that are permitted to be simultaneously in the consensus stage in the blockchain consensus network; and in response to determining that the number of subsets that are in the consensus stage is less than the preset maximum number, entering the first subset into the consensus stage by broadcasting a consensus proposal comprising the first subset to one or more nodes of the blockchain consensus network.

18. The system of claim 17, wherein the operations further comprise: after forming the plurality of subsets, assigning serial numbers to the subsets, wherein the assigned serial numbers are continuously and monotonically increasing natural numbers.

19. The system of claim 18, wherein the operations further comprise:
- determining a first serial number based on one or more serial numbers of one or more subsets that have completed the consensus stage;
- determining a second serial number based on one or more serial numbers of one or more subsets that have entered the consensus stage; and
- determining the number of subsets that are in the consensus stage based on the first serial number and the second serial number.

20. The system of claim 17, wherein the operations further comprise:
- before entering the first subset into the consensus stage, determining the number of subsets that are in the consensus stage; and
- after entering the first subset into the consensus stage, redetermining the number of subsets that are in the consensus stage.

* * * * *